United States Patent [19]

Seibold

[11] Patent Number: 4,808,981

[45] Date of Patent: Feb. 28, 1989

[54] AUTOMOTIVE ELECTRONIC COMMUNICATION APPARATUS WITH THEFT DISABLING, PARTICULARLY CAR RADIO OR SIMILAR AUTOMOTIVE AUDIO EQUIPMENT

[75] Inventor: Peter Seibold, Diekholzen, Fed. Rep. of Germany

[73] Assignee: Blaupunkt-Werke GmbH, Hildesheim, Fed. Rep. of Germany

[21] Appl. No.: 174,714

[22] Filed: Mar. 29, 1988

[30] Foreign Application Priority Data

May 21, 1987 [DE] Fed. Rep. of Germany ....... 3717054

[51] Int. Cl.⁴ .............................................. G08B 13/14
[52] U.S. Cl. ............................... 340/568; 307/10 AT; 340/63; 340/691; 340/825.31; 340/825.32
[58] Field of Search ................. 340/568, 63, 691, 540, 340/571, 825.31, 825.32; 307/10

[56] References Cited

U.S. PATENT DOCUMENTS

| | | | |
|---|---|---|---|
| 4,494,114 | 1/1985 | Kaish | 340/571 |
| 4,683,462 | 7/1987 | Takeda et al. | 340/825.32 |
| 4,720,700 | 1/1988 | Siebold et al. | 340/568 |
| 4,734,896 | 3/1988 | Soma et al. | 340/568 |
| 4,743,894 | 5/1988 | Bochmann | 340/63 |

*Primary Examiner*—Glen R. Swann, III
*Attorney, Agent, or Firm*—Frishauf, Holtz, Goodman & Woodward

[57] ABSTRACT

To prevent overriding an electronic car radio theft disabling system by connecting an external battery to a car radio prior to theft thereof, the radio includes a measuring circuit (7, 7') measures the impedance of a connected accessory, for example a loudspeaker or loudspeaker system (8), and if the impedance of connected loudspeaker does not match the impedance stored in a memory (5) of the car radio, operation of the radio is inhibited until the appropriate code word—known only to the proper owner—is reinserted.

12 Claims, 1 Drawing Sheet

AUTOMOTIVE ELECTRONIC COMMUNICATION APPARATUS WITH THEFT DISABLING, PARTICULARLY CAR RADIO OR SIMILAR AUTOMOTIVE AUDIO EQUIPMENT

Reference to related patent, assigned to the assignee of the present application, the disclosure of which is hereby incorporated by reference: U.S. Pat. No. 4,720,700, Jan. 18, 1988, Seibold and Strauss.

The present invention relates to automotive communication apparatus, and more particularly to theft prevention of car radios or similar automotive audio equipment, such as cassette radio combination, CB radios and the like.

BACKGROUND

As well known, car radios are frequently stolen, particularly from unattended parked vehicles. Various types of mechanical as well as electronic arrangements have been proposed which are intended to prevent unauthorized removal of the audio equipment - hereinafter for short "car radios"—or to so construct the car radios that, if removed, they then become useless and cannot be re-used. Thus, theft is intended to be prevent by so designing the radio that only an authorized user can operate it.

The referenced U.S. Pat. No. 4,720,700, assigned to the assignee of the present application and the disclosure of which is hereby incorporated by reference, describes a system and a method to inhibit operation of a radio upon unauthorized removal from a vehicle. The car radio includes a memory which has a code stored therein and which prevents operation of the apparatus if, after removal of the radio, the appropriate code word is not re-entered into the car radio. Removal of the car radio from a vehicle can be sensed either by permanent interruption of current supply from the vehicle battery or by sensing a certain position of the car radio in the vehicle, as described by coupling a potentiometer in the car radio, to the vehicle chassis so that, upon removal of the car radio, the setting of the potentiometer will be disturbed and, thus, the previously indicated code work which depended on the potentiometer setting, will be altered. The system works well; it has been found, however, in actual use that if the radio is removed by an authorized repair station, and is then re-inserted, it is difficult to reset the original potentiometer position. High mechanical precision of relatively movable parts is necessary which is expensive.

If the security of the car radio depends only on current supply, it has been found that some skilled thieves can override the current supply switches by supplying external battery power so that, upon artificially energizing the car radio before stealing it, the original code word will remain in the car radio and thus its operational utility will be preserved.

THE INVENTION

It is an object to improve the basic system described in the referenced U.S. Pat. No. 4,720,700, Seibold et al, by providing additional safety circuitry so that even if external additional power is supplied to the car radio, the security of the system is preserved.

Briefly, the basic and entirely effective system described in U.S. Pat. No. 4,720,700 is improved and expanded by including additional circuitry which, upon first energizing the car radio, measures the impedance of accessories, for example loudspeakers, connected to a terminal of the car radio and stores the impedance value. If the impedance value, upon reconnection of the car radio should differ from the previously stored values, then operation of the car radio is inhibited until the proper and known code word is again re-entered.

The arrangement has the advantage that the car radio does not require permanent current supply nor an electromechanical position sensing arrangement. Only electrical parameters need be measured, connected to terminals of the apparatus which are already present anyway, the electrical parameters being easily measured and stored. The system, thus, can be readily used with known microprocessors customarily present in modern car radios, and particularly inexpensive car radios providing high-quality reproduction, which are most subject to theft. Such audio systems frequently include special types of loudspeakers which may well have specific impedances at selected frequencies which differ from "factory installed" or standard equipment.

DRAWINGS, ILLUSTRATING AN EXAMPLE

DETAILED DESCRIPTION

Figure 1:
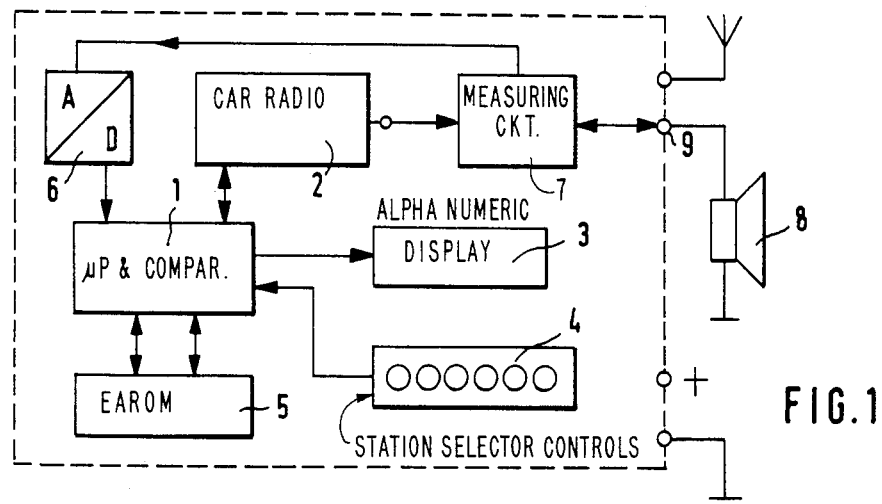
FIG. 1 is a basic block diagram of an automotive-type radio or communication equipment with an electronic disabling system in case of theft, including the improvement of the present invention.

FIG. 1 illustrates, highly schematically and in block diagram, a car radio which includes a microprocessor 1. The microprocessor 1 includes functional components and processes signals used in the theft disabling of the present invention; it normally also has different functions, for example digital tuning, control of tape mechanisms, and the like. All elements of the radio not necessary for an understanding of the present invention have ben shown, schematically, only by a single block 2. These elements do not form part of the present invention.

The microprocessor has an alphanumeric display 3 coupled thereto and input elements 4, for example station selector control. An electrically erasable, non-volatile memory, such as an electronically alterable read-only memory (EAROM) 5 is coupled to the microprocessor, for interchange of data therewith. The elements so far described are all standard and shown, with the same reference numerals, in the referenced U.S. Pat. No. 4,720,700.

In accordance with a feature of the invention, a measuring circuit 7 is coupled between the car radio 2 and one output terminal 9 thereof, the measuring circuit 7 measuring an electrical parameter of a connected element to the terminal 9. As shown, the connected element is the loudspeaker 8. The measuring circuit 7 is coupled through an analog/digital converter 6 to the microprocessor 1.

BASIC OPERATION

The car radio is inserted in a suitable receptacle in the vehicle and, after the car radio is secured and connected, the input unit 4, that is, the station selector control buttons are used to enter a code word in the microprocessor 1. At the same time, an impedance value measured by the measuring circuit 7 of the externally connected loudspeaker or loudspeakers 8 is, after conversion into a digital value, entered in the EAROM 5 and stored therein. The impedance value of the loudspeaker or loudspeakers 8 coupled to the terminal 9 are measured, for example in analog form, by the measuring circuit 7. The A/D converter 6 delivers the respective digital value to the microprocessor 1 which then enters the impedance value in digital form in a suitable address of the memory 5.

If the radio, after entry of the data, is to be used, the impedance value existing at the terminal 9 is sensed by the measuring circuit 7 and the value, after conversion into digital data, is compared with the initial value stored in the memory 5. Upon concurrence, the radio will operate. Upon non-concurrence, however, for example after theft of the radio and installation in a different vehicle, for example by connection to a different loudspeaker - even if only for testing, the radio 2 will not operate and the display 3 will request the user to enter the code word. This permits, for example, removal of the radio for maintenance or repair or, for example, upon sale of the vehicle, removal of the radio and reinstallation in another vehicle so that the owner, who only has knowledge of the code word, may re-use the radio with loudspeakers 8 of a different value and thus reestablish operation of the car radio and changed circumstances.

If the radio has been stolen, and a false code word is entered, entry of any code work is blocked for a period of time, for example several seconds. A second entry of the code word can then be made, for example if the owner had made a mistake after the first entry. The process can be repeated. The time can be extended for repeated entry, so that continuous entry of code words based on a "trial and error" system will not lead to rapid guessing of the code word. As the number of erroneous entries are increased, the time period between blockages can be increased exponentially.

Figure 2:
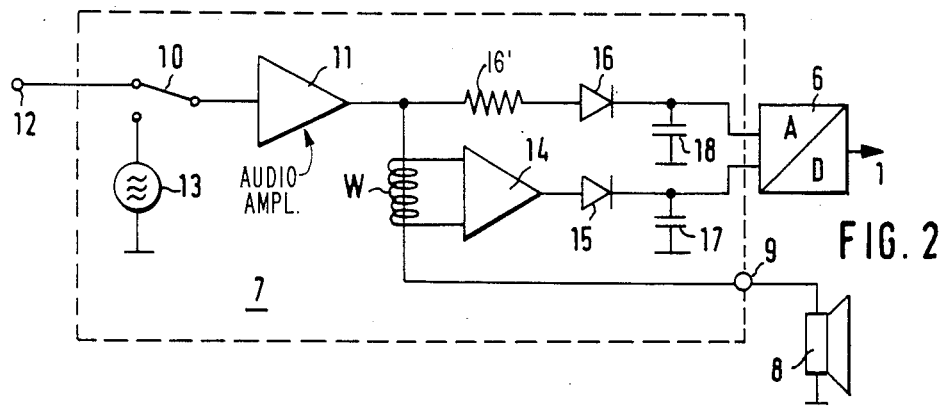
FIG. 2 is a fragmentary detailed circuit diagram showing the improvement in accordance with the present invention.

FIG. 2 illustrates the details of a circuit 7. The terminal 12 is coupled to the output of the demodulator stage in the car radio 2. Terminal 12 is, selectively, coupled through the transfer switch 10 to the input of the audio amplifier 11. Alternatively, and upon transfer of the switch 10, the input of the audio amplifier 11 can be coupled to an a-c frequency generator 13 providing, for example, a 40 kHz signal. The output of the audio amplifier 11 is connected through a current transformer W with the terminal 9 of the loudspeaker 8. The current transformer W is connected to the input of a measuring amplifier 14, the output of which is connected via a diode 15 with the input of the A/D converter 6. The audio amplifier 11 is further coupled through a coupling resistor 16' and a diode 16 with a further input of the A/D converter 6. Filter capacitors 17, 18 are connected between the diodes 15, 16 and the analog inputs of the A/D converter.

OPERATION

During a measuring phase or cycle, a—c voltage or signal generator 13 provides a 40 kHz signal to the amplifier 11 which is applied to the loudspeaker 8. The current flowing through the loudspeaker 8 is measured in the transformer W and is used as a basic for measuring the impedance of the loudspeaker 8, or an equivalent loudspeaker system.

Figure 3:
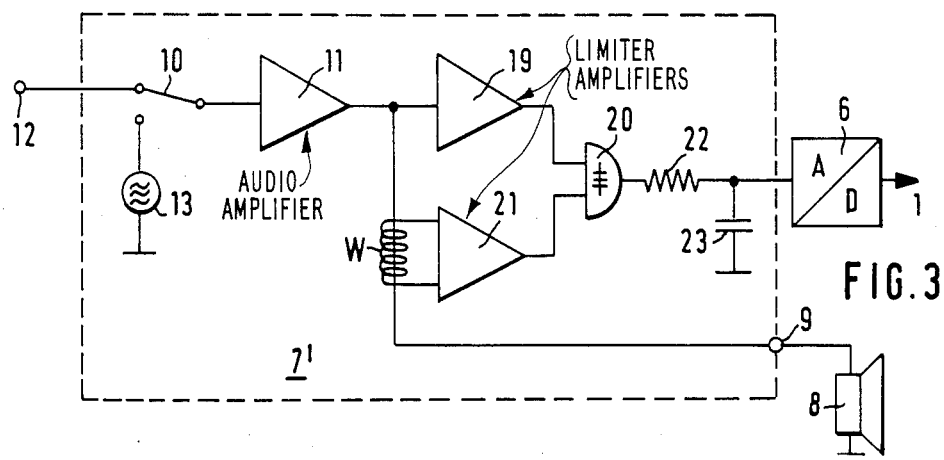
FIG. 3 is another circuit diagram in accordance with the present invention.

FIG. 3 illustrates a different way to measure the impedance at the loudspeaker terminal 9. The transfer switch 10 again transfers the input of the audio amplifier between either the demodulator output terminal 12 of the car radio 2 or the signal generator 13. The output terminal 9 of the loudspeaker is again, coupled to the output of the audio amplifier through a current transformer W. The output from the audio amplifier 11 is connected through a limiter amplifier 19 to one input of an EXCLUSIVE-OR-gate 20 which is conected to have the function of a phase discriminator. The output of the current transformer W is connected through a second limiter amplifier 21 with the second input of the EXCLUSIVE-OR gate 20, so that the gate 20 can carry out phase discrimination. The output from the phase discriminator OR-gate 20 is connected through a phase-voltage converter circuit formed by resistor 22 and capacitor 23 to the input of the A/D converter 6. The circuit combination 22, 23 converts the phase discriminated signals into suitable voltage signals of essentially square-wave form. The limiter amplifiers 19, 21 limit current and voltage, and the resulting square-wave signals are discriminated by the phase discriminator to provide a d-c output voltage proportional to the relative phases of the two signals derived from the limiter amplifiers 19, 21. The voltage obtained from the limiter amplifier 21 will depend on the impedance value of the loudspeaker or loudspeaker system 8 connected to the terminal 9.

The present invention can be used not only by measuring the impedance at a loudspeaker terminal but also to measure different parameters. It can be used by measuring impedances connected to anyone or a number of terminals of a car radio, in which, by experience, the impedance value after removal and re-installation, would differ significantly from a previously stored value. Since even loudspeakers of essentially similar construction may have different impedance values at the super-audible frequency of 40 kHz, discrimination between loudspeakers with which the radio is first used and, for example, after theft, subsequently used, can provide significant differences.

Various changes and modifications may be made and features described in connection with any one of the embodiments may be used with any of the other within the scope of the inventive concept.

The coupling resistor 16', diode 16, and capacitor 18 combination connected to the A/D converter 6 provides for measuring the voltage at terminal 9, since the impedance of the current transformer W, in effect, can be neglected. The analog portion of the A/D converter then carries out the computation: $Z = V/I$, to obtain the representative impedance value of the loudspeaker or loudspeaker system 8 and then provides this value to the digitizing portion of the A/D converter 1. Such a simple computation can readily be carried out, inherently, in A/D converters.

I claim:

1. Automotive electronic communication apparatus with theft disabling, particularly car radios or similar automotive audio equipment, comprising
  a memory (5) for storing
    (a) a selected code word, and
    (b) an impedance value;
  input means (1, 4) for entering code words into the memory;
  means (1) for preventing operation of the communication apparatus (2) until the selected code word is entered for storage into the memory after removal of the radio, and comprising measuring means (7, 7') coupled to an accessory terminal (9) of the communication apparatus (2) and measuring impedance of accessory equipment (8) connected to said terminal; and comparator means (1) coupled to the communication apparatus (2) and controlling operation thereof, said comparator means comparing the impedance of the accessory equipment (8) coupled to said accessory terminal (9) with the impedance value stored in the memory (5) and
  (i) upon coincidence, permitting operation of the communication apparatus (2), and
  (ii) upon non-coincidence, inhibiting operation of the communication apparatus until the selected code word, stored in the memory, is again entered into the input means (1, 4).

2. The apparatus of claim 1, wherein said accessory terminal (9) comprises at least one loudspeaker terminal, and said accessory equipment comprises a loudspeaker or a loudspeaker system.

3. The apparatus of claim 2, wherein the impedance measuring means includes an alternating voltage or signal generator (13) and transfer switch means (10) selectively connecting an alternating signal to said loudspeaker or loudspeaker system (8).

4. The apparatus of claim 3, wherein the signal generated by said voltage or signal generator (13) is in the super-audible range.

5. The apparatus of claim 3, wherein the signal generated by said voltage or signal generator (13) is in the order of about 40 kHz.

6. The apparatus of claim 3, wherein the measuring means (7) comprises current sensing means (W, 14) coupled to said accessory terminal (9) and determining current flow to said loudspeaker or loudspeaker system (9).

7. The apparatus of claim 6, wherein said measuring means further includes circuit connection means (16, 16', 18) having said alternating signal or frequency applied thereto.

8. The apparatus of claim 6, further including phase comparator means (20) comparing the phase of current flow to said accessory terminal and said loudspeaker or loudspeaker system with the phase of signals derived from said signal or frequency generating means;
  and circuit means (22, 23, 6) deriving a measured voltage representative of phase comparison signals derived from said phase comparator means (20).

9. The apparatus of claim 7, wherein the signal generated by said voltage or signal generator (13) is in the super-audible range.

10. The apparatus of claim 7, wherein the signal generated by said voltage or signal generator (13) is in the order of about 40 kHz.

11. The apparatus of claim 8, wherein the signal generated by said voltage or signal generator (13) is in the super-audible range.

12. The apparatus of claim 8, wherein the signal generated by said voltage or signal generator (13) is in the order of about 40 kHz.

* * * * *